Feb. 9, 1926.
M. FULLER
MOUNTING FOR WINDOW GLASS
Filed Nov. 17, 1923
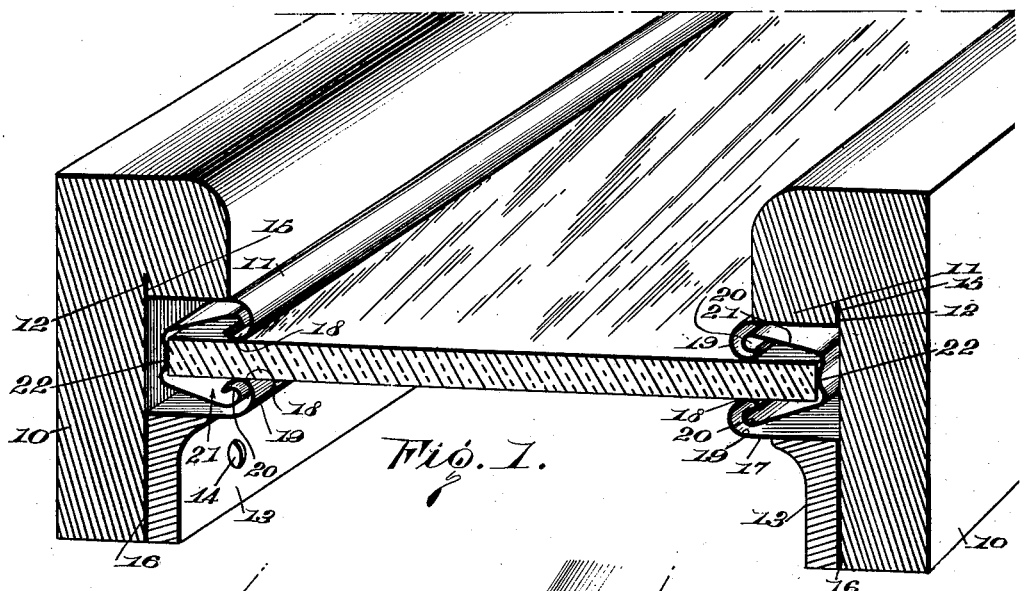
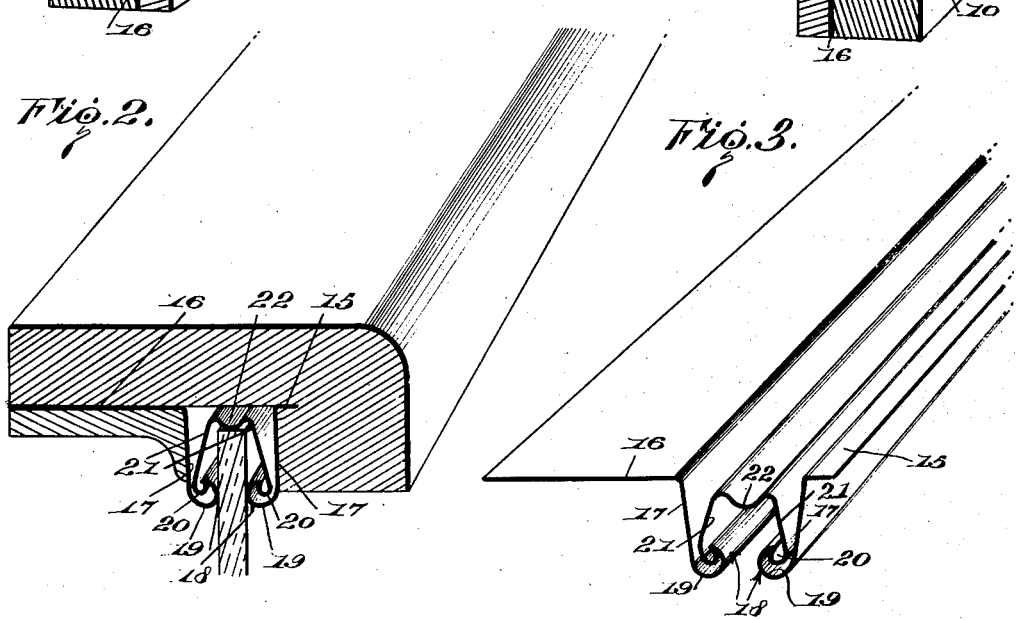
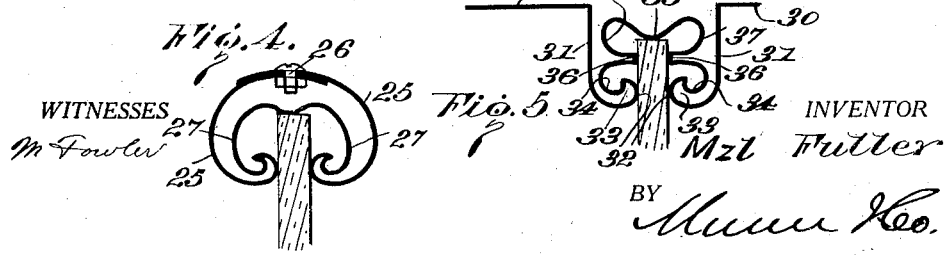
INVENTOR
M<sup>zl</sup> Fuller
BY
ATTORNEYS

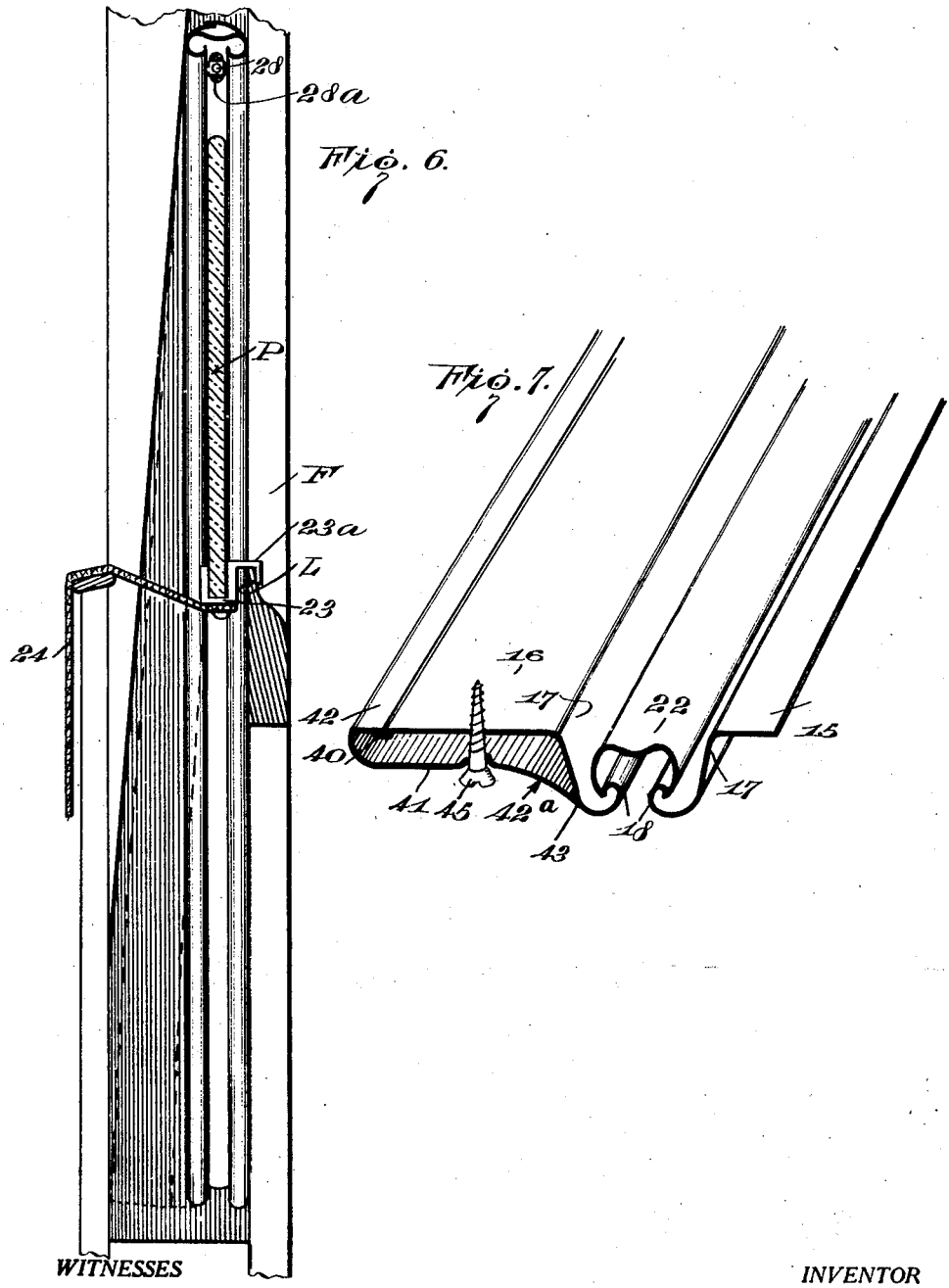

Patented Feb. 9, 1926.

1,572,427

UNITED STATES PATENT OFFICE.

MZL FULLER, OF CHATTANOOGA, TENNESSEE, ASSIGNOR TO FULLER AUTOMOBILE COMPANY, OF CHATTANOOGA, TENNESSEE, A CORPORATION OF TENNESSEE.

MOUNTING FOR WINDOW GLASS.

Application filed November 17, 1923. Serial No. 675,371.

*To all whom it may concern:*

Be it known that I, MZL FULLER, a citizen of the United States, and a resident of Chattanooga, in the county of Hamilton and State of Tennessee, have invented certain new and useful Improvements in Mountings for Window Glass, of which the following is a specification.

This invention relates to an improvement in mountings for window glass or the like, and is especially adapted for use in conjunction with the doors, windows or other openings of an automobile body.

The object of the invention is to provide a mounting of this character which obviates the necessity of using felt, rubber or other similar material and which at the same time so mounts the glass as to protect it from breakage or injury and as to avoid chattering while permitting the glass to be readily moved as may be necessary or desirable.

A further object is to provide a device of this character and having the foregoing capacities and advantages and which is at the same time of extremely simple and durable construction and adapted to be manufactured at a comparatively slight expense and from materials and by means of facilities ordinarily available, the mounting being also susceptible of immediate and instantaneous installation.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view, partly in perspective and partly in transverse horizontal section, showing the door of an automobile having embodied therein the glass mounting constituting the present invention;

Figure 2 is a view similar to Figure 1, but showing the upper part of the door in vertical section;

Figure 3 is a fragmentary detail view of the mounting detached;

Figure 4 is a view in section, showing a modified form of mounting;

Figure 5 is a view in section, showing a still further modified form of mounting;

Figure 6 is a view, partly in section and partly in elevation, showing the manner of mounting the form of the invention shown in Figure 4; and Figure 7 is a fragmentary perspective view, showing a slight variation of the form of the invention illustrated in Figures 1 to 3.

Referring to the drawings wherein for the sake of illustration is shown the preferred embodiments of the invention and more particularly to Figures 1 to 3 of the drawings, the numeral 10 designates the standards of the frame of the door of an automobile body. These standards 10 include shoulders 11 which overhang to some extent slots 12. Molding 13 is provided and is releasably secured by fastening devices 14 to the standards 10, the molding being associated with a mounting which constitutes the present invention in a manner which will presently be more fully described.

The mounting which constitutes the present invention is preferably constructed of resilient sheet metal and is shaped and formed to provide attaching flanges 15 and 16, the attaching flange 15 being relatively small and being fitted in the groove 12 and the attaching flange 16 being interposed between the molding 13 and the opposed parts or portions of the standards. Outer connecting portions 17 are integrally formed with the flanges 15 and 16 and extend therefrom in converging relation. Along their outer edges these portions 17 are rolled or otherwise formed to provide yieldable or resilient bearing surfaces 18 adapted to engage the opposite side of the glass along or slightly spaced from the marginal edges thereof. The partial coil 19 which is formed by rolling the edges of the outer connecting portions 17 in the manner above described curves away from the glass to provide the side bearing surfaces 18, and beyond this partial coil thus constituted the material or metal of the mounting is reversely coiled or curved, as indicated at 20, and is then extended to provide inner connecting portions 21 which converge inwardly toward each other and which carry and are integrally formed with an edge bearing surface 22. The edge bearing surface 22 is also curved to enhance its resilient action and to better adapt it to have line contact with the edge of the glass, this edge bearing surface 22 extending transversely between the inner edges of the connecting portions 21.

It is to be understood that a mounting of the character described is employed along each side of the glass as shown in Figure 1 and along the top edge thereof when the glass has been moved to closed position as shown in Figure 2. Of course the invention is susceptible of embodiment in a stationary window structure, in which event the mounting is provided along the bottom of the glass as well as along the top and side edges.

In assembly, when the molding 13 has been fastened to the standard it serves to tension to some extent the coils 19 and 20. The side bearing surfaces 18 being yieldable or resilient and being resiliently supported by the connecting portions 17 properly support the glass against lateral displacement while permitting the same to partake of its necessary movements and having the yieldable or springy qualities essential to prevent chattering and to preserve the glass against breakage or injury. The edge bearings 22 are also resilient or yieldable in themselves due to their transverse curvature and they are also yieldably supported by virtue of the provision of the coils 19 and 20. At the same time should the glass be subjected to forces tending to displace it edgewise, its movement will be restrained not only by the action of the edge bearing 22 but also by virtue of the fact that any yieldable movement of the edge bearing will tend to press the yieldable side bearings 18 more firmly into engagement with the sides of the glass.

The embodiment of the invention shown in Figure 4 is similar to that shown in Figures 1 to 3 and hereinabove described except that the outer connecting portions designated at 25 and corresponding to the connecting portions 17 are curved and have their edges overlapped and secured to each other, as indicated at 26. Also the inner connecting portions herein designated at 27 and corresponding to the portions 21 of the forms shown in Figures 1 to 3 are also curved. As shown in Figure 6 this form of the invention has the upper end of its overlapped outer connecting portions 25 pivotally mounted on the framing, as at 28. One such mounting is provided on each side of the pane of glass designated at P, and each side frame member F is so formed as to permit each mounting to swing about its pivots 28 from the position shown in full lines in Figure 6 to the position shown in dotted lines in the same figure. The lower end of each pane of glass carries an attaching bracket 23 having a lug 23ª integral therewith and a strap 24 secured thereto. When the pane of glass P is raised the lug 23ª engages over a ledge L to support the pane of glass in raised position. When the glass is to be lowered the strap 24 is grasped to elevate the pane of glass P to such an extent as to disengage the lug 23ª from the ledge L whereupon the parts are swung about the pivot 28 from the position shown in full lines in Figure 6 to the position shown in dotted lines in the same figure. The pane of glass P is then lowered by means of the strap 24. This same strap 24 also serves to elevate the glass. As shown in Figure 6 the edge bearing of this form of mounting is provided with a number of openings 28ª to permit of the insertion of the pivots and of the bolt and nuts 26.

In Figure 5 attaching plates or flanges designated at 29 and 30 are provided as in the embodiment shown in Figures 1 and 3 and are mounted in the same manner as the attaching plates 15 and 16 in the said embodiment. The outer connecting portions, designated at 31 are substantially parallel and are rolled or formed to provide side bearing surfaces 32 as before. The formation of the side bearing surfaces 32 is brought about by the provision of the section of coil, designated at 33 and beyond this coil 33 a reversely arranged coil 34 is provided. In the form shown in Figure 5, there is formed between the side bearings 32 and the edge bearing 35 auxiliary side bearings 36, the side bearings 36 being constituted by bending inwardly and suitably shaping the metal making up the inner connecting portions designated generally at 37. This arrangement provides a five point bearing for each edge of the glass with which the mounting is associated and yet is endowed with all of the features of resiliency and the like had by the other embodiments of the invention.

A variation of the form of the invention shown in Figures 1 to 3 is illustrated in Figure 7. This variation of Figures 1 to 3 is concerned only with the attaching flange 16, the molding and the action of the molding in respect of the mounting. As shown in Figure 7 the attaching flange 16 is slightly smaller and is provided with an offset rib 40 along its marginal edge. A separate piece of molding 41 is provided and is constructed from a piece of resilient metal. The molding is provided with an inturned flange 42 which is disposed to lie in the same plane as the attaching flange 16 and which has its edge snugly fitted against the offset lip 40 of the flange 16. A portion of the molding 41 is transversely curved, as indicated at 42ª and the edge of this transversely curved portion bears as at 43, against the juncture of one of the outer connecting portions 17 and the roll which constitutes one of the side bearing surfaces 18. Fastening means shown for the sake of illustration as comprising screws 45 extending through openings provided therefor in the molding 41 and flange 16 and adapted to engage the frame of the door or window serve to hold the molding in position and to regulate the tension with which the mounting engages the glass.

It is to be understood that any suitable means may be employed in conjunction with the forms of the invention shown in Figures 1, 2, 3, 5 and 7 for raising and lowering the glass panes and for maintaining the panes raised. Various expedients for effecting these objects are widely used and well known to those skilled in the art and need no detailed explanation here.

I claim:

1. A mounting for window glass constructed of a single piece of resilient metal and having attaching flanges, outer connecting portions extending in converging relation from said attaching flanges and being coiled along their outer edges to present bearing surfaces engageable with the opposite sides of the glass, diverging inner connecting portions having their outer edges reversely coiled with respect to the coils of the outer connecting portions and integral therewith, and a curved bearing portion integral with the inner edges of the inner connecting portions and extending transversely therebetween.

2. A mounting for window glass constructed of a single piece of resilient metal and having attaching flanges, outer connecting portions extending from said attaching flanges and being coiled along their outer edges to present bearing surfaces engageable with the opposite sides of the glass, inner connecting portions having their outer edges reversely coiled with respect to the coils of the outer connecting portions and integral therewith, and a bearing portion integral with the inner edges of the inner connecting portions and extending transversely therebetween.

3. A mounting for window glass having yieldably mounted side bearing surfaces and a yieldable edge bearing surface connected to and carried by the side bearing surfaces, said edge bearing surface and said side bearing surfaces being connected in such manner that when one of the surfaces yields the others will be pressed more firmly into engagement with the glass by virtue of the yielding movement.

MZL FULLER.